United States Patent
Kim et al.

(10) Patent No.: US 9,698,407 B2
(45) Date of Patent: Jul. 4, 2017

(54) RECHARGEABLE BATTERY

(71) Applicant: SAMSUNG SDI CO., LTD., Yongin-si, Gyeonggi-do (KR)

(72) Inventors: Sung-Kab Kim, Yongin-si (KR); Myung-Jae Jang, Yongin-si (KR); Sung-Hoon Kim, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 40 days.

(21) Appl. No.: 14/718,290

(22) Filed: May 21, 2015

(65) Prior Publication Data
US 2016/0093865 A1    Mar. 31, 2016

(30) Foreign Application Priority Data
Sep. 26, 2014    (KR) .......................... 10-2014-0129179

(51) Int. Cl.
*H01M 2/30*    (2006.01)
*H01M 2/34*    (2006.01)

(52) U.S. Cl.
CPC .............. *H01M 2/30* (2013.01); *H01M 2/34* (2013.01)

(58) Field of Classification Search
CPC .................................... H01M 2/30; H01M 2/34
See application file for complete search history.

(56) References Cited

U.S. PATENT DOCUMENTS

| | | | |
|---|---|---|---|
| 2007/0196731 A1* | 8/2007 | Hyung | H01M 2/027 429/164 |
| 2009/0305126 A1* | 12/2009 | Choi | H01M 2/30 429/159 |
| 2010/0209746 A1* | 8/2010 | Kiyama | H01M 2/1235 429/56 |
| 2012/0021277 A1* | 1/2012 | Byun | H01M 2/0469 429/178 |
| 2012/0058389 A1* | 3/2012 | Guen | H01M 2/0237 429/179 |
| 2012/0121966 A1* | 5/2012 | Kim | H01M 10/0436 429/158 |

FOREIGN PATENT DOCUMENTS

| | | |
|---|---|---|
| KR | 10-2012-0099919 A | 9/2012 |
| KR | 10-2013-0036989 A | 4/2013 |
| KR | 10-2013-0106649 A | 9/2013 |

* cited by examiner

*Primary Examiner* — Eugenia Wang
(74) *Attorney, Agent, or Firm* — Lee & Morse, P.C.

(57) ABSTRACT

A rechargeable battery includes an electrode assembly including a first electrode and a second electrode; a case for accommodating the electrode assembly; a cap plate in an opening of the case to seal the case, including a terminal hole, and connected to the first electrode through a lead tab; and first and second electrode terminals electrically coupled to the electrode assembly and protruding away from the cap plate, the first electrode terminal including plurality of lead terminals connected to the cap plate, and a plate terminal supported by the plurality of lead terminals to be spaced apart from the cap plate.

9 Claims, 8 Drawing Sheets

RECHARGEABLE BATTERY

CROSS-REFERENCE TO RELATED APPLICATION

Korean Patent Application No. 10-2014-0129179, filed on Sep. 26, 2014, in the Korean Intellectual Property Office, and entitled: "Rechargeable Battery," is incorporated by reference herein in its entirety.

BACKGROUND

1. Field

Provided is a rechargeable battery.

2. Description of the Related Art

A rechargeable battery differs from a primary battery in that a rechargeable battery may be repeatedly charged and discharged, while a primary battery may be incapable of being recharged.

SUMMARY

Embodiments may be realized by providing a rechargeable battery, including an electrode assembly including a first electrode and a second electrode; a case for accommodating the electrode assembly; a cap plate in an opening of the case to seal the case, including a terminal hole, and connected to the first electrode through a lead tab; and first and second electrode terminals electrically coupled to the electrode assembly and protruding away from the cap plate, the first electrode terminal including a plurality of lead terminals connected to the cap plate, and a plate terminal supported by the plurality of lead terminals to be spaced apart from the cap plate.

The plurality of lead terminals may protrude from opposite edge sides of the plate terminal.

One end of each of the plurality of lead terminals may be bent to contact the plate terminal.

Each of the plurality of lead terminals may have a width of 1.5 mm to 3 mm.

A support tab may protrude from the plate terminal and may contact a surface of the cap plate to support the plate terminal.

The support tab may protrude toward the cap plate from a surface of the plate terminal.

A plurality of support tabs may protrude toward the cap plate from an edge of the plate terminal.

The plate terminal may include a plurality of concavo-convex portions on a surface thereof to contact a bus bar.

The second electrode terminal may include a rivet terminal electrically coupled to the electrode assembly; a flange that outwardly extends from the rivet terminal inside the case; and a plate terminal electrically coupled to the rivet terminal outside of the cap plate.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The drawings and description are to be regarded as illustrative in nature and not restrictive, and like reference numerals designate like elements throughout the specification. In the drawing figures, the dimensions of layers and regions may be exaggerated for clarity of illustration.

Figure 1:
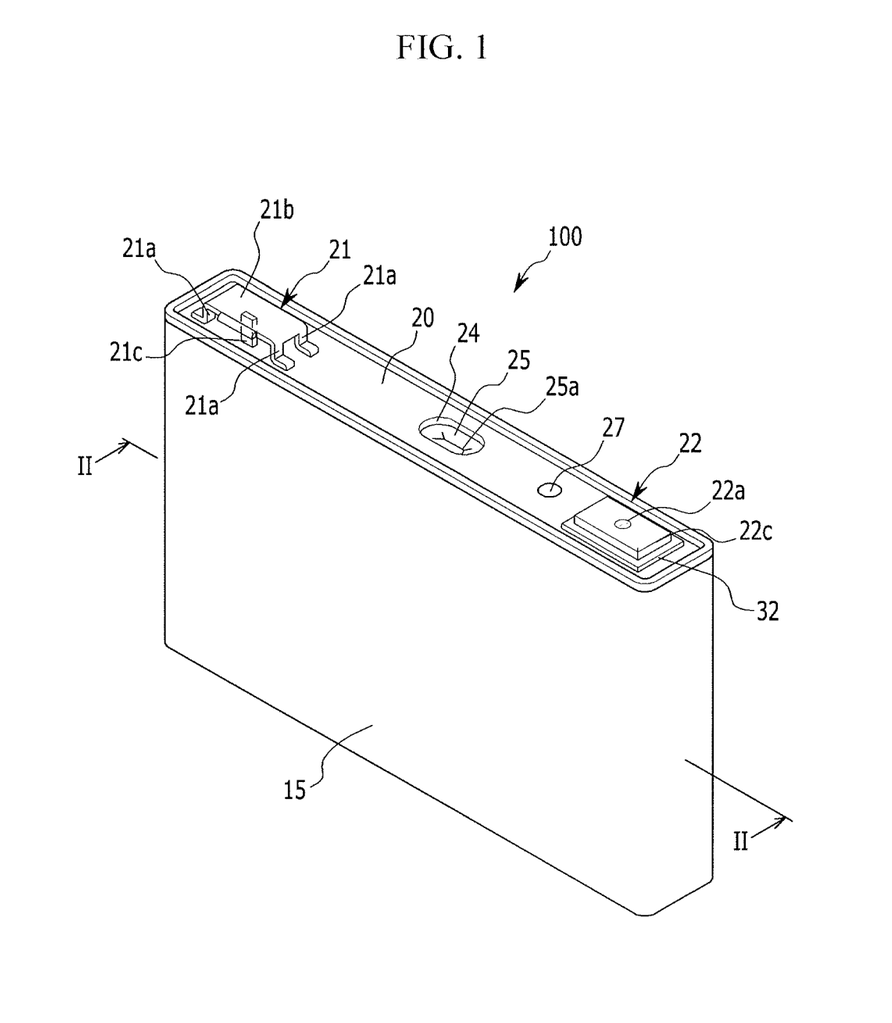
FIG. 1 illustrates a schematic perspective view of a rechargeable battery according to first exemplary embodiment.
Figure 2:
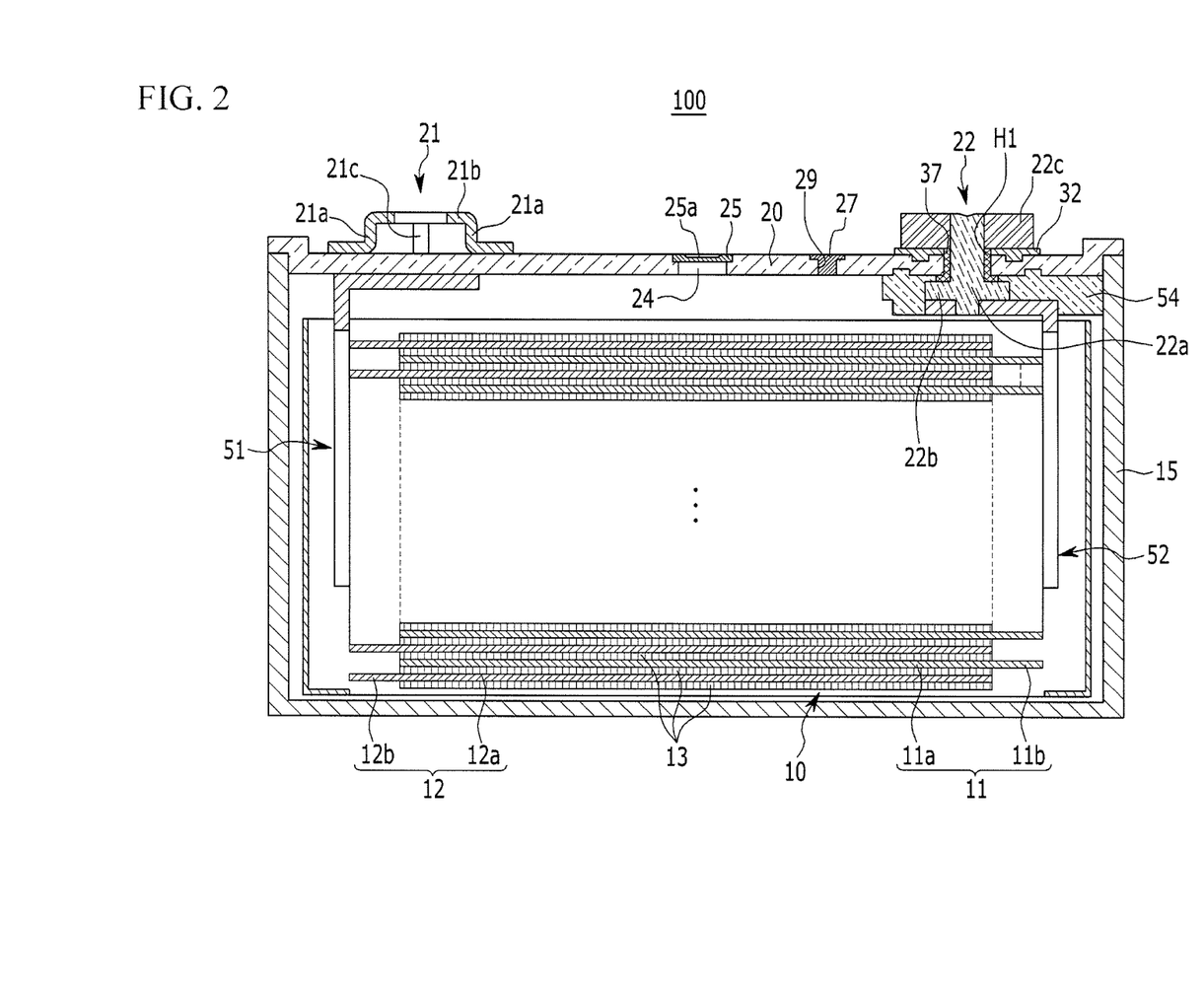
FIG. 2 illustrates a drawing of FIG. 1 taken along the line II-II.
Figure 3:
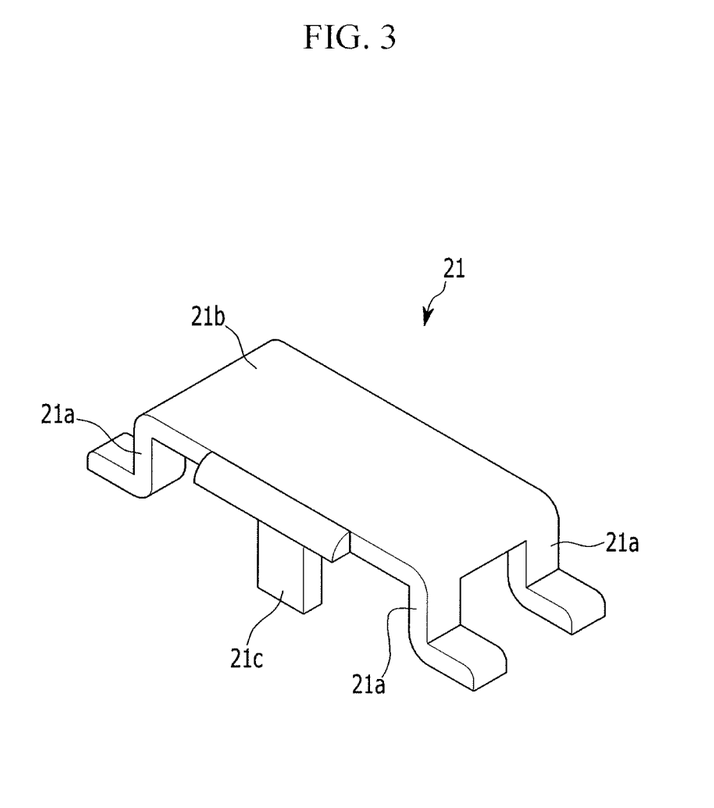
FIG. 3 illustrates a schematic perspective view of a first electrode terminal according to the first exemplary embodiment.
Figure 4:
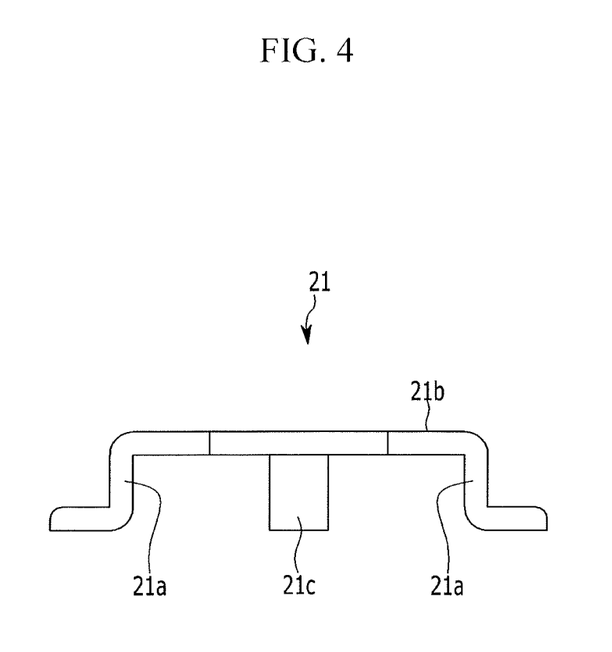
FIG. 4 illustrates a schematic lateral side view of the first electrode terminal of FIG. 3.

FIG. 1 illustrates a schematic perspective view of a rechargeable battery according to first exemplary embodiment, FIG. 2 illustrates a drawing of FIG. 1 taken along the line II-II, FIG. 3 illustrates a schematic perspective view of a first electrode terminal according to the first exemplary embodiment, and FIG. 4 illustrates a schematic lateral side view of the first electrode terminal of FIG. 3.

As shown in FIGS. 1 to 4, the rechargeable battery 100 according to the first exemplary embodiment may include: an electrode assembly 10 including a first electrode 12 and a second electrode 11; a case 15 for accommodating the electrode assembly 10; a cap plate 20 provided in an opening of the case 15 to seal the case 15, formed with a terminal hole H1, and coupled to the first electrode 12 through a positive electrode current collecting tab 51; and first and second electrode terminals 21 and 22 electrically coupled to the electrode assembly 10 and protruding away from the cap plate 20.

For example, the electrode assembly 10 may be formed by disposing the first electrode (hereinafter referred to as a "positive electrode") 12 and the second electrode (hereinafter referred to as a "negative electrode") 11 at respective sides of a separator 13, which may serve as an insulator, and then spirally-winding the negative electrode 11, the separator 13, and the positive electrode 12 in a jelly-roll shape.

The negative and positive electrodes 11 and 12 may respectively include coated regions 11a and 12a where an active material is coated on a current collector formed of a metal plate, and uncoated regions 11b and 12b where the active material is not coated thereon to expose the current collector. The uncoated region 11b of the negative electrode 11 may be formed at one end portion of the negative electrode 11 along the spirally wound negative electrode 11. The uncoated region 12b of the positive electrode 12 may be formed at one end portion of the positive electrode 12 along the spirally wound positive electrode 12, and the uncoated regions 11b and 12b may be respectively disposed at opposite ends of the electrode assembly 10.

As an example, the case 15 may be formed in an approximately cuboid shape to accommodate the electrode assembly 10 and an electrolyte solution, and an opening may be formed at one side of the cuboid to connect inner and outer spaces thereof. The opening may be formed to allow the electrode assembly 10 to be inserted into the case 15.

The cap plate 20 may be provided in the opening of the case 15 to seal the case 15. For example, the case 15 and the cap plate 20 may be formed of aluminum, and may be welded to each other.

An electrolyte injection opening 29, a vent hole 24, and the terminal hole H1 may be provided in the cap plate 20. After combining the cap plate 20 to the case 15, the electrolyte injection opening 29 may allow the electrolyte solution to be injected into the case 15. After the electrolyte solution is injected, the electrolyte injection opening 29 may be sealed by a sealing cap 27.

The vent hole 24 may be sealed by a vent plate 25, and the vent plate may release internal pressure of the rechargeable battery 100. When the internal pressure of the rechargeable battery 100 reaches a predetermined pressure, the vent plate 25 may be ruptured to open the vent hole 24. The vent plate 25 may have a notch groove 25a that induces the rupture.

The negative electrode gasket 37 may be provided between a rivet terminal 22a of the negative electrode terminal 22 and an inner side of the terminal hole H1 of the cap plate 20, and may provide a seal and electrical insulation between the rivet terminal 22a of the negative electrode terminal 22 and the cap plate 20. The negative electrode gasket 37 may be provided, e.g., may be elongated, between a flange 22b and an inner side of the cap plate 20, and may further provide a seal and electrically insulation between the flange 22b and the cap plate 20. By installing the negative electrode gasket 37 and the negative electrode terminal 22 in the cap plate 20, leakage of the electrolyte solution through the terminal hole H1 may be prevented.

A negative electrode current collecting tab 52 may electrically couple the negative electrode terminal 22 to the negative electrode 11 of the electrode assembly 10. By combining the negative electrode current collecting tab 52 to a lower end of the rivet terminal 22a and caulking the lower end thereof, the negative electrode current collecting tab 52 may be supported by the flange 22b and may be connected to the lower end of the rivet terminal 22a.

A positive electrode current collecting tab 51 may electrically couple the positive electrode 12 of the electrode assembly 10 to a bottom surface of the cap plate 20. The positive electrode current collecting tab 51 may be formed to be bent such that it is coupled to the cap plate 20, and the positive electrode current collecting tab 51 may maintain a state of being electrically coupled to the cap plate 20 through, for example, welding.

A lower insulating member 54 may be provided between the negative electrode current collecting tab 52 and the cap plate 20, and the lower insulating member 54 may electrically insulate the negative electrode current collecting tab 52 from the cap plate 20. One side of the lower insulating member 54 may be coupled to the cap plate 20 while the other side may enclose the negative electrode current collecting tab 52, the rivet terminal 22a, and the flange 22b, and a connection structure therebetween may be stabilized.

The negative electrode gasket 37 may be provided, e.g. may be elongated, between the rivet terminal 22a and an upper insulating member 32. The negative electrode gasket 37 may reinforce sealing and electrical insulation between the rivet terminal 22a and the upper insulating member 32.

The electrode terminals 21 and 22 may include the first electrode terminal 21 and the second electrode terminal 22. The first electrode terminal 21 may refer to a positive electrode terminal, and the second electrode terminal 22 may refer to a negative electrode terminal.

Referring back to FIG. 2, the first electrode terminal 21 may include a plurality of lead terminals 21a that are coupled to the cap plate 20, and a plate terminal 21b that is supported by the lead terminals 21a to be spaced apart from the cap plate 20. The plate terminal 21b may be electrically coupled while being spaced apart from the cap plate 20 by the lead terminals 21a. The plate terminal 21b may refer to a portion to which a bus bar (not shown) is coupled by, for example, welding. In the present exemplary embodiment, the plate terminal 21b may be formed to have a flat surface to which the bus bar is coupled.

One end of the lead terminal 21a may be electrically coupled to a surface of the cap plate 20 by, for example, welding, while the other end may be integrally coupled with the plate terminal 21b. One end of the lead terminal 21a may be welded to the surface of the cap plate 20. For example, a bent end of the lead terminal 21a may be welded to the surface of the cap plate 20.

One end of the lead terminal 21a may be bent, a contact area with the cap plate 20 may be further increased, and one end of the lead terminal 21a may be stably welded to the cap plate 20. A plurality of lead terminals 21a may be respectively coupled to opposite edge sides of the plate terminal 21b. The lead terminal 21a may not protrude from the opposite edge sides of the plate terminal 21b. In an embodiment, a plurality of lead terminals 21a may protrude along the edge of the plate terminal 21b.

In the present exemplary embodiment, the lead terminal 21a having a width of 1.5 mm to 3 mm may protrude from the edge of the plate terminal 21b to be coupled to the cap plate 20. The lead terminal 21a may be formed to have the width of 1.5 mm to 3 mm, and the lead terminal 21a may effectively perform a fuse function. For example, the edge of the plate terminal 21b may be partially connected to the cap plate 20 through the lead terminal 21a.

Resistance may be increased while a current transferred from the electrode assembly 10 flows through the lead terminal 21a, the lead terminal 21a may be broken when an amount of current exceeding a predetermined level flows therethrough, and the lead terminal 21a may perform the fuse function. The lead terminal 21a may be formed to have the width of 1.5 mm to 3 mm, and the lead terminal 21a may be easily broken when the amount of current exceeding the predetermined level flows therethrough.

Output of the rechargeable battery 100 may deteriorate when the width of the lead terminal 21a is less than 1.5 mm, and when the width of the lead terminal 21a exceeds 3 mm, the rechargeable battery 100 may be easily short-circuited when a current of approximately 1500 A to 4000 A flows therethrough. In the present exemplary embodiment, the lead terminal 21a may have the width of 1.5 mm to 3 mm.

As described above, the first electrode terminal 21 may serve as the positive electrode terminal and may be electrically coupled to the surface of the cap plate 20 while protruding therefrom by the lead terminals 21a. When an amount of current exceeding the predetermined level flows through the rechargeable battery 100, the lead terminals 21a are broken, and damage, for example, due to an overcurrent, may be effectively prevented.

A support tab 21c may protrude toward the cap plate 20 from the plate terminal 21b of the first electrode terminal 21. In the present exemplary embodiment, the plate terminal 21b may be spaced apart from the surface of the cap plate 20 and may be supported by the support tab 21c, which may contact the cap plate 20, such that the plate terminal 21b may not be dented while being connected to the bus bar. The bus bar may be stably coupled to the first electrode terminal 21, and structural stability of the rechargeable battery 100 may be improved.

The second electrode terminal 22 may be provided in the terminal hole H1 of the cap plate 20, and may be electrically coupled to the electrode assembly 10. For example, the second electrode terminal 22 may be electrically coupled to the negative electrode 11 of the electrode assembly 10, and the electrode assembly 10 may be protrude through the case 15 through the negative electrode terminal 22.

The second electrode terminal 22 will be described in more detail. The second electrode terminal 22 may include the rivet terminal 22a that may be provided in the terminal hole H1 of the cap plate 20 to be electrically coupled to the electrode assembly 10, the flange 22b that may be integrally and widely formed at an inner side of the cap plate 20 with the rivet terminal 22a (e.g., the flange 22b may outwardly extend from the rivet terminal 22a inside the case 15), and a plate terminal 22c that may be disposed outside of the cap plate 20 to be electrically coupled to the rivet terminal 22a.

Figure 5:
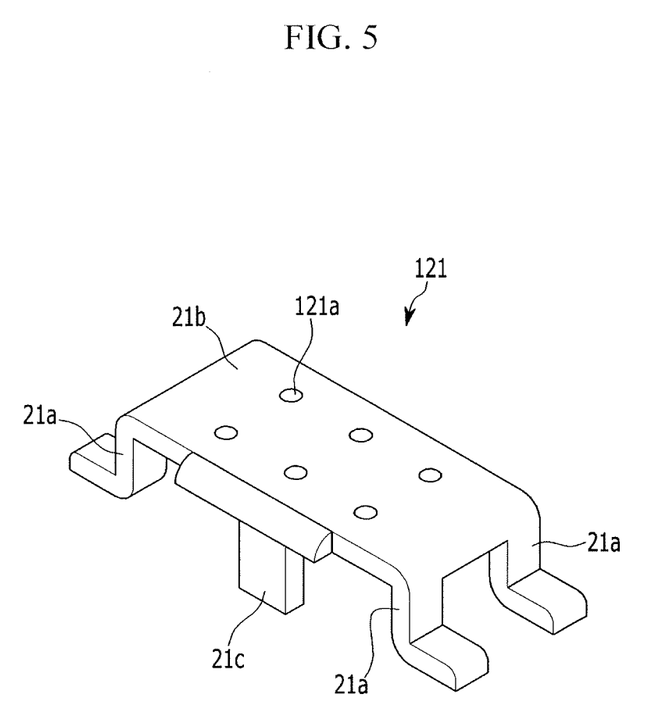
FIG. 5 illustrates a schematic perspective view of a first electrode terminal according to a second exemplary embodiment.
Figure 6:
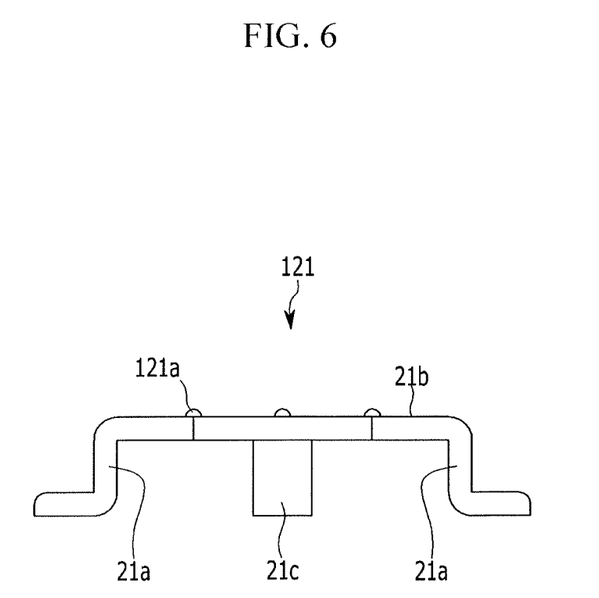
FIG. 6 illustrates a schematic lateral side view of the first electrode terminal of FIG. 5.

FIG. 5 illustrates a schematic perspective view of a first electrode terminal according to a second exemplary embodiment, and FIG. 6 illustrates a schematic lateral side view of the first electrode terminal of FIG. 5. The same reference numerals as those in FIGS. 1 to 4 refer to the same members having the same functions. Hereinafter, a detailed description of the same reference numerals will be omitted.

As shown in FIG. 5, in a plate terminal 121 of the first electrode terminal of the rechargeable battery according to the second exemplary embodiment, a concavo-convex portion 121a may be formed. A plurality of concavo-convex portions 121a may protrude in the plate terminal 21b while being equally spaced from each other.

The bus bar (not shown) may be connected to the plate terminal 21b, the plurality of concavo-convex portions 121a may protrude on the surface of the plate terminal 21b, and a frictional force may be applied therebetween. For example, the bus bar may be initially mounted on the plate terminal 21b, the concavo-convex portions 121a may apply frictional force, and the bus bar may be stably positioned. The bus bar may be coupled to the plate terminal 21b by, for example, welding, and connection failure may be effectively prevented.

Figure 7:
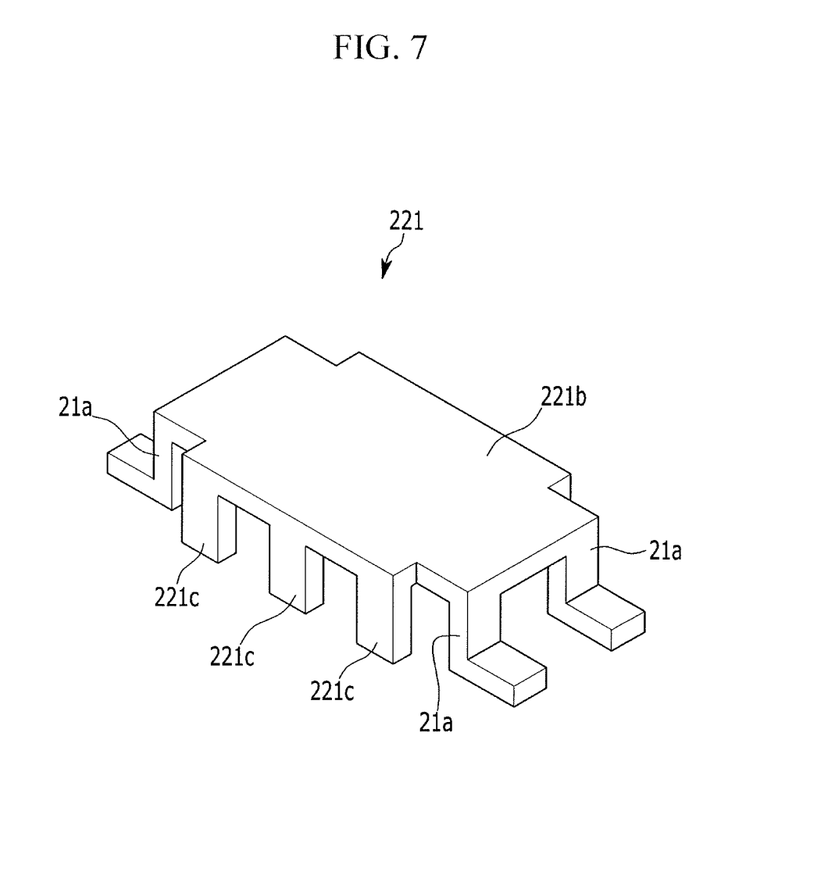
FIG. 7 illustrates a schematic perspective view of a first electrode terminal according to a third exemplary embodiment.
Figure 8:
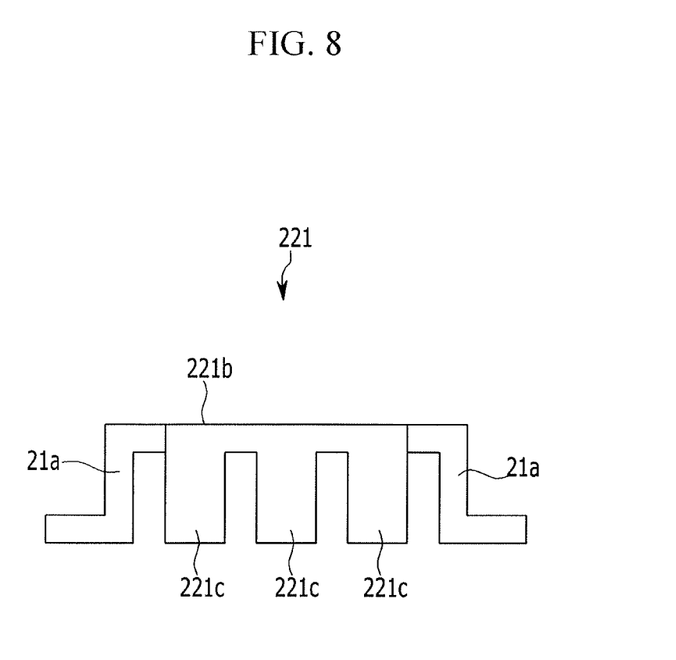
FIG. 8 illustrates a schematic lateral side view of the first electrode terminal of FIG. 7.

FIG. 7 illustrates a schematic perspective view of a first electrode terminal according to a third exemplary embodiment, and FIG. 8 illustrates a schematic lateral side view of the first electrode terminal of FIG. 7. The same reference numerals as those in FIGS. 1 to 7 refer to the same members having the same functions. Hereinafter, a detailed description of the same reference numerals will be omitted.

As shown in FIGS. 7 and 8, a plurality of support tabs 221c may protrude at an edge of a plate terminal 221b of a first electrode terminal 221 of a rechargeable battery according to the third exemplary embodiment. Two or more support tabs 221c may protrude at opposite long edge sides of the plate terminal 221b.

The plurality of support tabs 221c may protrude at the lateral sides of the plate terminal 221b while being equally spaced from each other, and the plate terminal 221b may be more stably supported on the surface of the cap plate 20. The bus bar may be connected to the plate terminal 221b, the support tabs 221c may further improve durability, and a more stable rechargeable battery may be provided.

By way of summation and review, a low-capacity rechargeable battery may be used in small portable electronic devices such as mobile phones, notebook computers, and camcorders, while a high-capacity rechargeable battery may be used, for example, as a power source for driving a motor of a hybrid vehicle. Rechargeable batteries include, for example, nickel-cadmium (Ni—Cd) batteries, nickel-hydrogen (Ni-MH) batteries, lithium (Li) batteries, and lithium ion (Li-ion) rechargeable batteries. Li-ion rechargeable batteries may have an operating voltage three times as high as those of Ni—Cd batteries and Ni-MH batteries that may be used as a power supply of portable electronic devices. Lithium ion rechargeable batteries may have relatively high energy density per unit weight.

In rechargeable batteries, a lithium-based oxide may be used as a positive active material, and a carbon material may be used as a negative active material. Batteries may be classified into liquid electrolyte batteries and polymer electrolyte batteries depending on the type of electrolyte, and lithium batteries using a liquid electrolyte may be called lithium ion batteries, while batteries using a polymer electrolyte may be called lithium polymer batteries. Rechargeable batteries may be damaged by pressure increase or ignition, for example, due to explosion, when an abnormal reaction takes place or an overcurrent flows therethrough.

Provided is a rechargeable battery that may allow a positive electrode terminal protruding away from the rechargeable battery to include a fuse function, and may prevent, for example, explosion due to an overcurrent when the overcurrent flows therethrough. According to the exemplary embodiment, the first electrode terminal may serve as the positive electrode terminal, and may be electrically coupled to the surface of the cap plate while protruding therefrom by lead terminals. When an amount of current exceeding a predetermined level flows through the rechargeable battery, the lead terminals may be broken, and damage, for example, due to the overcurrent, may be to effectively prevented.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly including a first electrode and a second electrode;
   a case for accommodating the electrode assembly;
   a cap plate in an opening of the case to seal the case, including a terminal hole, and connected to the first electrode through a lead tab; and
   first and second electrode terminals electrically coupled to the electrode assembly and protruding away from the cap plate, the first electrode terminal including:
   a plurality of lead terminals connected to the cap plate, a plate terminal supported by the plurality of lead terminals to be spaced apart from the cap plate, wherein the plurality of lead terminals have widths such that the plurality of lead terminals are broken when an amount of current exceeding a predetermined level flows therethrough, and wherein a support tab protrudes from the plate terminal and contacts an outer surface of the cap plate to support the plate terminal and maintain a space between the plate terminal and the cap plate.

2. The rechargeable battery as claimed in claim 1, wherein the plurality of lead terminals protrude from opposite edge sides of the plate terminal.

3. The rechargeable battery as claimed in claim 2, wherein one end of each of the plurality of lead terminals is bent to contact the plate terminal.

4. The rechargeable battery as claimed in claim 3, wherein the widths range from 1.5 mm to 3 mm.

5. The rechargeable battery as claimed in claim 2, wherein more than one lead terminal from among the plurality of lead terminals protrude from each of the opposite edge sides of the plate terminal.

6. The rechargeable battery as claimed in claim 1, wherein the support tab protrudes toward the cap plate from a surface of the plate terminal.

7. The rechargeable battery as claimed in claim 1, wherein a plurality of support tabs protrude toward the cap plate from an edge of the plate terminal.

8. The rechargeable battery as claimed in claim 1, wherein the plate terminal includes a plurality of concavo-convex portions on a surface thereof to contact and apply frictional force to a bus bar such that the bus bar is stably positioned.

9. The rechargeable battery as claimed in claim 1, wherein the second electrode terminal includes:

a rivet terminal electrically coupled to the electrode assembly;

a flange that outwardly extends from the rivet terminal inside the case; and a plate terminal electrically coupled to the rivet terminal outside of the cap plate.

* * * * *